（12） United States Patent
Li et al.

(10) Patent No.: US 11,700,553 B2
(45) Date of Patent: Jul. 11, 2023

(54) METHOD OF APPARATUS FOR MONITORING FOR A RADIO LINK FAILURE ASSOCIATED WITH A SECONDARY CELL OF A SECONDARY BASE STATION

(71) Applicant: Nokia Technologies Oy, Espoo (FI)

(72) Inventors: Haitao Li, Beijing (CN); Lei Du, Beijing (CN)

(73) Assignee: Nokia Technologies Oy, Espoo (FI)

( * ) Notice: Subject to any disclaimer, the term of this patent is extended or adjusted under 35 U.S.C. 154(b) by 69 days.

(21) Appl. No.: 16/636,725

(22) PCT Filed: Aug. 10, 2017

(86) PCT No.: PCT/CN2017/096855
§ 371 (c)(1),
(2) Date: Feb. 5, 2020

(87) PCT Pub. No.: WO2019/028747
PCT Pub. Date: Feb. 14, 2019

(65) Prior Publication Data
US 2020/0169925 A1 May 28, 2020

(51) Int. Cl.
*H04W 36/00* (2009.01)
*H04W 36/30* (2009.01)
(Continued)

(52) U.S. Cl.
CPC ....... *H04W 36/0069* (2018.08); *H04W 36/08* (2013.01); *H04W 36/305* (2018.08); *H04W 36/36* (2013.01)

(58) Field of Classification Search
CPC .......... H04W 36/0069; H04W 36/305; H04W 36/08; H04W 36/36; H04W 76/15; H04W 76/19; H04W 76/27; H04W 92/20; H04W 36/0072; H04W 74/0833; H04W 84/045; H04W 24/10; H04W 36/0027; H04W 36/30; H04W 76/18; H04W 76/10;
(Continued)

(56) References Cited

U.S. PATENT DOCUMENTS

2013/0012213 A1\* 1/2013 Iwamura ............... H04W 16/30
455/446
2015/0327107 A1 11/2015 Kim et al.
(Continued)

FOREIGN PATENT DOCUMENTS

CN 104854906 A 8/2015
CN 106538034 A 3/2017
(Continued)

OTHER PUBLICATIONS

"SCG Re-establishment in EN-DC", LG Electronics Inc., 3GPP TSG-RAN WG2 Meeting #97bis, R2-1703683, Apr. 2017, 3 pages.
(Continued)

*Primary Examiner* — Golam Sorowar
(74) *Attorney, Agent, or Firm* — Harrington & Smith

(57) ABSTRACT

A method includes monitoring for a radio link failure associated with a secondary cell of a secondary base station. This may be a PScell. A user device may select a second secondary cell as a target secondary cell. The user device initiates a relocation procedure with the target secondary cell.

13 Claims, 5 Drawing Sheets

(51) Int. Cl.
*H04W 36/08* (2009.01)
*H04W 36/36* (2009.01)

(58) Field of Classification Search
CPC ..... H04W 76/20; H04W 36/14; H04W 48/16; H04W 74/006; H04W 36/04; H04W 88/08; H04W 36/0005; H04W 76/28; H04W 88/06; H04W 24/02; H04W 72/042; H04W 76/12; H04W 68/02; H04W 36/28; H04W 56/00
See application file for complete search history.

(56) References Cited

U.S. PATENT DOCUMENTS

| | | | |
|---|---|---|---|
| 2016/0044744 A1* | 2/2016 | Lee | H04W 16/32 370/329 |
| 2016/0242092 A1 | 8/2016 | Rosa et al. | 36/30 |
| 2017/0055187 A1 | 5/2017 | Kang et al. | 36/61 |
| 2017/0325143 A1* | 11/2017 | Dai | H04W 36/08 |
| 2017/0374705 A1* | 12/2017 | Mitsui | H04W 36/0069 |
| 2018/0279218 A1* | 9/2018 | Park | H04W 48/20 |
| 2019/0387420 A1* | 12/2019 | Li | H04W 76/18 |

FOREIGN PATENT DOCUMENTS

| | | |
|---|---|---|
| WO | WO 2014/190524 A1 | 12/2014 |
| WO | WO 2015/019172 A2 | 2/2015 |
| WO | WO 2015/176738 A1 | 11/2015 |
| WO | WO 2016/021821 A1 | 2/2016 |
| WO | WO 2016/182670 A1 | 11/2016 |

OTHER PUBLICATIONS

Bertrand, Pierre, et al., "Chapter 19—Random Access" LTE—The UMTS Long Term Evolution: From Theory To Practice, 2009, 40 pages.

* cited by examiner

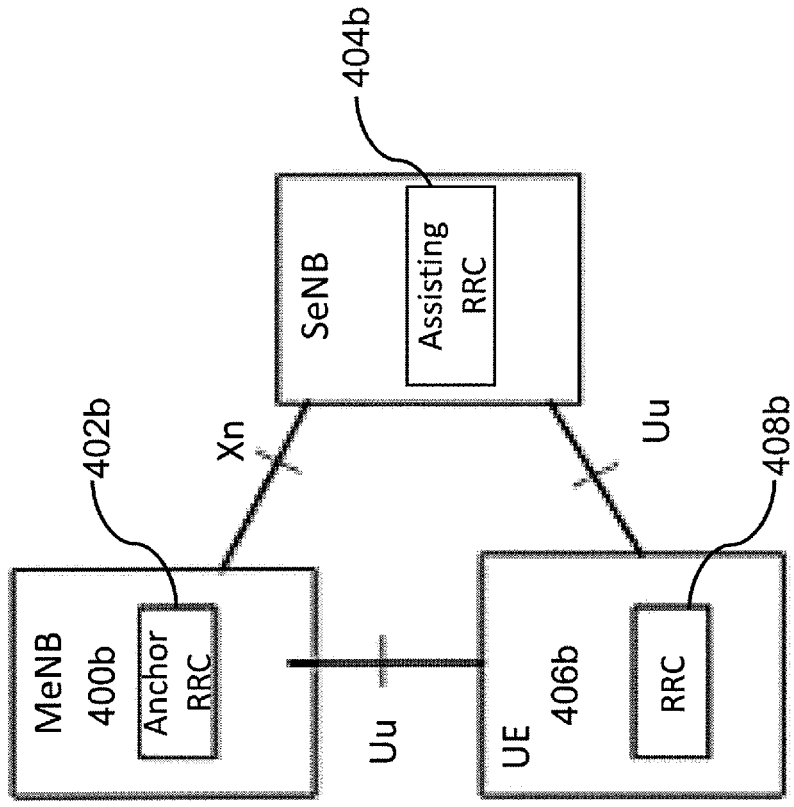
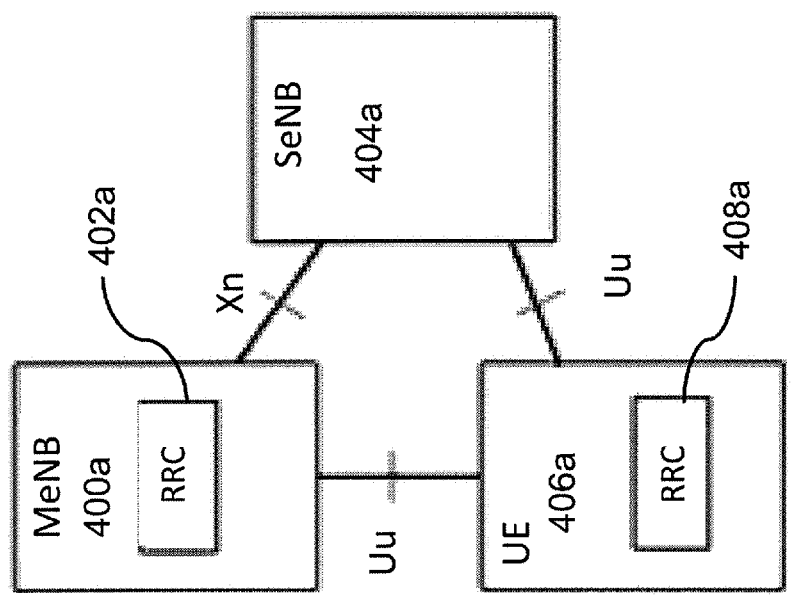

METHOD OF APPARATUS FOR MONITORING FOR A RADIO LINK FAILURE ASSOCIATED WITH A SECONDARY CELL OF A SECONDARY BASE STATION

CROSS REFERENCE TO RELATED APPLICATION

This patent application is a U.S. National Stage application of International Patent Application Number PCT/CN2017/096855 filed Aug. 10, 2017, which is hereby incorporated by reference in its entirety.

FIELD

This disclosure relates to a method and apparatus and in particular but not exclusively a method and apparatus for use in a case of dual connectivity in a communication system.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or Wi-Fi). Wi-Fi is often used synonymously with WLAN. The wireless systems can be divided into cells, and are therefore often referred to as cellular systems.

A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The current 3GPP standardization effort is directed to what is termed as the $5^{th}$ Generation (5G) system. The 5G system is sometimes referred to as NR (new radio).

An aspect of 5G is the so-called New Radio Access Technology (NR). Dual connectivity (DC) has been proposed. Dual connectivity is a mode of operation where a communication device in a radio resource control (RRC) connected mode is configured for dual connectivity over two communication paths, or legs, with a Master Cell Group (MCG) and a Secondary Cell Group (SCG), respectively.

It is noted that the above discussed issues are not limited to any particular communication environment, but may occur in any appropriate communication system.

SUMMARY

According to an aspect, there is provided a method comprising: responsive to a radio link problem associated with a first secondary cell of a secondary base station, selecting a second secondary cell as a target secondary cell; and causing a user device to initiate a relocation procedure with said target secondary cell.

The causing the user device to initiate the relocation procedure with said target secondary cell may comprise causing the user device to transmit directly to the secondary base station a relocation request.

The relocation request may request relocation of said secondary cell from the first secondary cell to the second secondary cell.

The method may comprise receiving a first response to said relocation request and in response thereto causing information about said second secondary cell to be transmitted to a primary base station by said user device.

The first response may comprise an acknowledgement of said relocation request.

The method may comprise receiving a second response to said relocation request and in response thereto causing failure information about said second secondary cell to be transmitted to a primary base station.

The second response may comprise a rejection of a request of said relocation request.

The failure information may comprise one or more of: radio link failure cause information; measurement information; and existing secondary cell group configuration information.

The method may comprise monitoring said secondary cell to determine said radio link problem.

The radio link problem may comprise a radio link failure.

The first and second secondary cells may comprise primary secondary cells.

The user device may have dual connectivity with said secondary base station and a primary base station.

The primary and secondary base stations may operate with a same radio access technology.

The primary and secondary base stations may operate with a different radio access technology An apparatus may be provided to perform the previous methods. The apparatus may be provided in the user device.

According to another aspect, there is provided a method comprising: responsive to a radio link problem associated with a first secondary cell of a secondary base station, receiving from a user device a relocation request at the secondary base station requesting relocation of said secondary cell from the first secondary cell to a second secondary cell.

The method may comprise causing a first response to said relocation request to be transmitted to said user device.

The first response may comprise an acknowledgement of said relocation request.

The method may comprise causing a second response to said relocation request to be transmitted to said user device.

The second response may comprise a rejection of a request of said relocation request.

The radio link problem may comprise a radio link failure.

The first and second secondary cells may comprise primary secondary cells.

The user device may have dual connectivity with said secondary base station and a primary base station.

The primary and secondary base stations may operate with a same radio access technology.

The primary and secondary base stations may operate with a different radio access technology.

An apparatus may be provided to perform the previous methods. The apparatus may be provided in the secondary base station.

According to an aspect, there is provided an apparatus in a communication device, the apparatus comprising at least one processor, and at least one memory including computer program code, wherein the at least one memory and the computer program code are configured, with the at least one processor, to: responsive to a radio link problem associated with a first secondary cell of a secondary base station, select a second secondary cell as a target secondary cell; and cause a relocation procedure with said target secondary cell to be initiated.

The at least one memory and the computer code may be configured with the at least one processor to initiate the relocation procedure with said target secondary cell by transmitting directly to the secondary base station a relocation request.

The relocation request may request relocation of said secondary cell from the first secondary cell to the second secondary cell.

The at least one memory and the computer code may be configured with the at least one processor to receive a first response to said relocation request and in response thereto cause information about said second secondary cell to be transmitted to a primary base station.

The first response may comprise an acknowledgement of said relocation request.

The at least one memory and the computer code may be configured with the at least one processor to receive a second response to said relocation request and in response thereto cause failure information about said second secondary cell to be transmitted to a primary base station.

The second response may comprise a rejection of a request of said relocation request.

The failure information may comprise one or more of: radio link failure cause information; measurement information; and existing secondary cell group configuration information.

The at least one memory and the computer code may be configured with the at least one processor to monitor said secondary cell to determine said radio link problem.

The radio link problem may comprise a radio link failure.

The first and second secondary cells may comprise primary secondary cells.

The user device may have dual connectivity with said secondary base station and a primary base station.

The primary and secondary base stations may operate with a same radio access technology.

The primary and secondary base stations may operate with a different radio access technology According to another aspect, there is provided an apparatus in a secondary base station, said apparatus comprising at least one processor, and at least one memory including computer program code, wherein the at least one memory and the computer program code are configured, with the at least one processor, to: responsive to a radio link problem associated with a first secondary cell of the secondary base station, receive from a user device a relocation request requesting relocation of said secondary cell from the first secondary cell to a second secondary cell.

The at least one memory and the computer code may be configured with the at least one processor to cause a first response to said relocation request to be transmitted to said user device.

The first response may comprise an acknowledgement of said relocation request.

The at least one memory and the computer code may be configured with the at least one processor to cause a second response to said relocation request to be transmitted to said user device.

The second response may comprise a rejection of a request of said relocation request.

The radio link problem may comprise a radio link failure.

The first and second secondary cells may comprise primary secondary cells.

The user device may have dual connectivity with said secondary base station and a primary base station.

The primary and secondary base stations may operate with a same radio access technology.

The primary and secondary base stations may operate with a different radio access technology.

According to another aspect, there is provided a method comprising: responsive to a radio link problem associated with a first secondary cell of a secondary base station, causing a user device to send information to a primary base station, said information comprising current secondary cell group information.

The information may comprise at least part of a secondary cell group failure report.

The current secondary cell group information may comprise current configuration.

According to another aspect, there is provided a method comprising: responsive to a radio link problem associated with a first secondary cell of a secondary base station, receiving information from a user device at a primary base station, said information comprising current secondary cell group information; and using said current cell group information when performing a secondary cell modification procedure.

The information may comprise at least part of a secondary cell group failure report.

With this information the primary base station will have a full secondary cell group configuration, which is used in performing a secondary cell modification procedure.

The performing of the second cell modification procedure may be to a target secondary cell.

The current secondary cell group information may comprise current configuration.

According to an aspect, there is provided an apparatus in a communication device, the apparatus comprising at least one processor, and at least one memory including computer program code, wherein the at least one memory and the computer program code are configured, with the at least one processor, to: responsive to a radio link problem associated with a first secondary cell of a secondary base station, cause information to be transmitted to a primary base station, said information comprising current secondary cell group information.

The information may comprise at least part of a secondary cell group failure report.

The current secondary cell group information may comprise current configuration.

According to another aspect, there is provided an apparatus in a primary base station, said apparatus comprising at least one processor, and at least one memory including computer program code, wherein the at least one memory and the computer program code are configured, with the at least one processor, to: responsive to a radio link problem associated with a first secondary cell of a secondary base station, receive information from a user device, said information comprising current secondary cell group information; and use said current cell group information when performing a secondary cell modification procedure.

The information may comprise at least part of a secondary cell group failure report.

With this information the primary base station will have a full secondary cell group configuration, which is used in performing a secondary cell modification procedure.

The performing of the second cell modification procedure may be to a target secondary cell.

The current secondary cell group information may comprise current configuration.

A device and/or a communication system comprising an apparatus configured to provide at least one of the embodiments can also be provided. The device may comprise a communication device such as a user equipment or another node capable of wireless communication, or a network node.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

BRIEF DESCRIPTION OF FIGURES

Some embodiments will now be described in further detail, by way of example only, with reference to the following examples and accompanying drawings, in which:

FIG. 3a shows a first example of dual connectivity;
FIG. 3b shows a second example of dual connectivity.

DETAILED DESCRIPTION OF PREFERRED EMBODIMENTS

Figure 1:
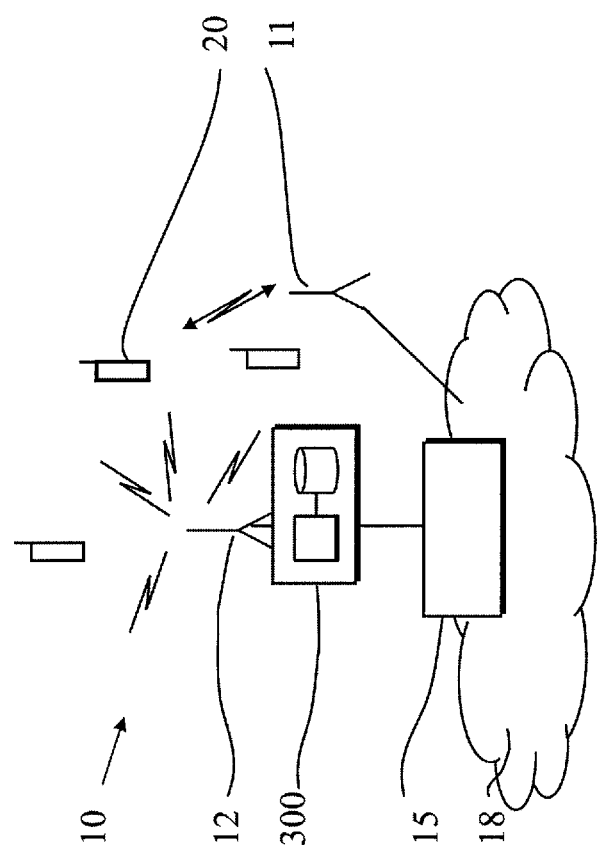
FIG. 1 shows an example of a radio access system.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2 and apparatus of FIG. 5, to assist in understanding the described examples.

A communication device can be used for accessing various services and/or applications provided via a communication system. In wireless communication systems the access is provided via a wireless access interface between wireless communication devices and an appropriate access system. A device may access wirelessly a communication system via a base station. A base station site can provide one or more cells of a cellular system. In the FIG. 1 example, a base station 12 can provide e.g. three cells on different carriers. In addition to the base station 12, at least one serving cell can also be provided by means of another station or stations. For example, at least one of the carriers may be provided by a station that is not co-located at base station 12. This possibility is denoted by station 11 in FIG. 1. This may be dual connectivity which will be discussed in more detail later. Interaction between the different stations and/or controllers thereof can be arranged in various manners. Each mobile device 20 and base station may have one or more radio channels open at the same time and may receive signals from more than one source.

A base station node can be connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A base station node is sometimes referred to an access point, a Node B, an evolved node B (eNB), or gNode B (gNB), depending on the standard. eNB is LTE and gNB is 5G.

Figure 2:
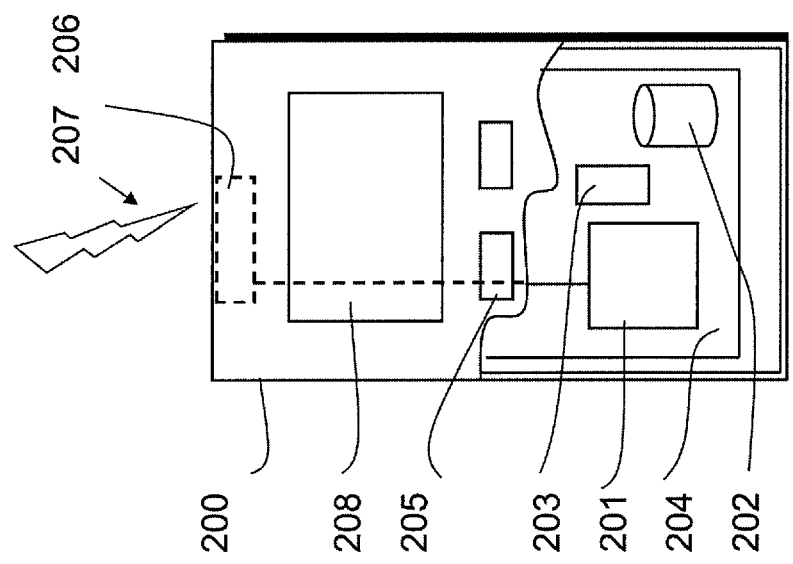
FIG. 2 shows an example of a communication device.

FIG. 2 shows a schematic, partially sectioned view of a communication device 20 that a user can use for communications. Such a communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications via base stations and/or other user terminals. The data processing, storage and other relevant control apparatus can be provided on an appropriate circuit board and/or in chipsets. This apparatus is denoted by reference 26.

A user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus may be provided with cognitive radio capability. The transceiver may be provided for example by means of a radio part and associated antenna arrangement. The antenna arrangement may be arranged internally or externally to the mobile device.

The communication device can access a communication system based on various access techniques, for example those based on the third Generation Partnership Project (3GPP) specifications or any other suitable specifications. Some embodiments may be provided in the context of so-called 5G or New Radio standards. Of course, other embodiments may be provided in the context of other standards. NR operations can use high bit rates, such as for 5G operations, and in NR a system bandwidth can be aggregated over more than one carrier.

Figure 5:
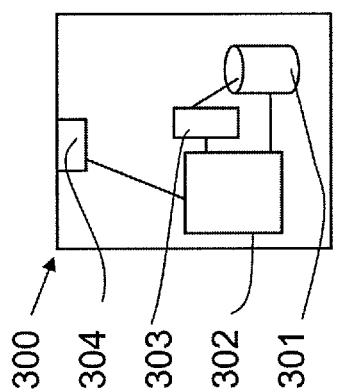
FIG. 5 shows an example of an apparatus.

FIG. 5 shows an example of an apparatus 300 provided in or associated with a base station, as shown in FIG. 1. The apparatus comprises at least one memory 301, at least one data processing unit or at least one data processor 302, 303 and an input/output interface 304. Via the interface the apparatus can be coupled to a receiver and a transmitter of the base station.

Some embodiments relates to the radio link failure (RLF) handling. Some embodiments relate to LTE-NR interworking and NR-NR dual connectivity scenarios.

Dual connectivity is a mode of operation of a UE in RRC_CONNECTED mode, configured for dual connectivity with a Master Cell Group (MCG) and a Secondary Cell Group (SCG).

In LTE, radio link failure behaviour is specified, for example, in the 3GPP specification TS36.300 section 10.1.6. This discusses two phases which govern the behaviour associated with radio link failure.

A first phase is started when a radio problem is detected which leads to radio link failure detection. There is no UE-based mobility. This first phase is based on a timer or another (e.g. counting) criteria. This first phase may be associated with a first time T1.

A second phase may be started after the first phase and may be started upon radio link failure detection or handover failure. This may lead to the UE going to the RRC_IDLE (radio resource connection-idle) mode from the RRC_connected mode, after the end of the second phase. There may be UE-based mobility. This second phase may be timer based and may be associated with a second time T2.

In the second phase, in order to resume activity and avoid going via the RRC_IDLE mode when the UE returns to the same cell, when the UE selects a different cell from the same eNB or when the UE selects a cell from a different eNB, the following procedure applies: The UE stays in RRC_CONNECTED mode and the UE accesses the respective cell through the random access procedure. The UE identifier used in the random access procedure for contention resolution is used by the selected eNB to authenticate the UE and check whether it has a context stored for that UE. The UE identifier may be for example, the C RNTI (cell radio network temporary identifier) of the UE in the cell where the RLF occurred, the physical layer identity of that cell and a short MAC-I (media access control identifier) based on the keys of that cell.

If the eNB finds a context that matches the identity of the UE, or obtains this context from the previously serving eNB, it indicates to the UE that its connection can be resumed;

If the context is not found, the RRC connection is released and UE initiates procedure to establish new RRC connection. In this case UE is required to go via RRC_IDLE mode.

For DC, a PCell (primary cell) supports above phases. A PCell may be provided by a master or primary base station. In addition, the first phase of the radio link failure procedure is supported for PSCell (primary secondary cell). A PSCell may be provided by a secondary base station SeNB (secondary eNB). However, upon detecting RLF on the PSCell, the re-establishment procedure is not triggered at the end of the first phase. Instead, UE informs the radio link failure of PSCell to the MeNB (master eNB).

According one proposal, on RLF, the UE initiates a RRC reestablishment procedure to recover the connection upon RLF. If the UE succeeds in accessing a cell where the UE context is available, the RRC connection is recovered. Otherwise, the RRC connection is released and the UE goes to RRC IDLE state.

In case of LTE DC, it is proposed that the RLF procedure applies only to the PCell i.e. MCG-RLF. While the UE also monitors PSCell, the UE informs the MeNB of the RLF of the secondary node i.e. SCG-RLF (S-RLF) rather than initiating the reestablishment procedure. The details of S-RLF handling is discussed in TS36.331 section 5.3.11 and 5.6.13.

The UE considers radio link failure to be detected for the SCG i.e. SCG-RLF if a timer associated with RLF (e.g. so-called T313) expires, if there is random access problem indication from the SCG MAC, or if there is an indication from SCG RLC (radio link control) that the maximum number of retransmissions has been reached for an SCG or split DRB (data radio bearer).

If a RLF for the SCG is detected, the UE initiates the SCG failure information procedure to report the SCG radio link failure.

The UE may discard the radio link failure information, i.e. release the UE variable VarRLF-Report, 48 hours after the radio link failure is detected, upon power off or upon detach.

The UE may initiate the SCG failure information procedure when the SCG transmission is not suspended and when one of the following conditions is met:

on detecting radio link failure for the SCG, on SCG change failure; or on stopping an uplink transmission towards the PSCell due to exceeding a maximum uplink transmission timing difference.

When the SCG failure information procedure is initiated, the UE may suspend all SCG DRBs and suspend SCG transmission for split DRBs, reset the SCG-MAC, stops a timer (e.g. the so-called T307 timer) and initiate transmission of a SCG failure information message.

It has been proposed that in the connected mode, the UE declares RLF upon timer expiry due to DL OOS (out of sync) detection, random access procedure failure detection, and RLC failure detection.

It has been proposed that for the NR RLM (radio link monitoring) procedure, the physical layer determines or generates an out of sync/in sync indication and the RRC declares RLF.

It has been proposed that, for RLF purposes, the in sync/out of sync indication should be a per cell indication.

It may be desirable to have a single procedure for both multi-beam and single beam operation.

In LTE dual connectivity operation, a UE stays in a single RRC state, i.e., either RRC_CONNECTED or RRC_IDLE. With this principle, two architecture alternatives for RRC have been considered. The first option is shown in FIG. 3a and the second option is shown in FIG. 3b. Option 1 has been proposed as the RRC protocol architecture for LTE DC.

In the option 1 shown in FIG. 3a, there is a MeNB 400a, a UE 406a and a SeNB 404a. The MeNB 400a has an RRC function 402a and the UE 406a has an RRC function 408a. Each of the MeNB, the UE and the SeNB is in communication with other two entities. In option 1, only the MeNB 400a generates the final RRC messages to be sent towards the UE 406a after the coordination of RRM (radio resource management) functions between MeNB and SeNB. The UE RRC entity 408a sees all messages coming only from one RRC entity 402a (in the MeNB) and the UE only replies back to that entity.

In the option 2 shown in FIG. 3b, there is a MeNB 400b, a UE 406b and a SeNB 404b. The MeNB 400b has an anchor RRC function 402b, the UE 406b has an RRC function 408a and the SeNB 404b has an assisting RRC function 410b. Each of the MeNB, the UE and the SeNB is in communication with other two entities. In option 2, the MeNB and SeNB can generate final RRC messages to be sent towards the UE after the coordination of RRM functions between MeNB and SeNB and may send those directly to the UE (depending on L2 architecture) and the UE may replies accordingly.

With the first option, option1, there is a RRC function in MeNB but not in the SeNB. The UE monitors the PScell for RLF detection of the SCG. Upon SCG-RLF, the UE suspends all SCG DRBs and the SCG transmission for split DRBs. The UE sends the SCG failure information message to the MeNB. The message comprises the failure type, measurement results of the Scells, and the best non-serving cells so that the MeNB could select another Scell within the SCG or even change SCG to continue the dual connectivity operation. Since the SeNB does not support transmitting the RRC messages to the UE directly, the S-RLF handling relies on the UE communicating with the MeNB, and the MeNB coordinating with the SeNB to recover the DC. This scenario would take a longer time, for example, at least twice the backhaul latency. This may increase the signalling load due to going through backhaul. (The backhaul is the link between the MeNB and the SeNB).

Option 2 may be used as the RRC protocol architecture for LTE-NR interworking in the New Radio (NR) system. Due to the different RATs (radio access technology), it may be easier to have the NR configure its lower layer parameters to the UE directly rather than going through LTE.

With the same RATs, e.g. NR-NR DC, option 2 may have advantages since the direct RRC configuration from the SgNB minimizes the signalling latency for URLLC (ultra reliable low latency communications) services. With the assisting RRC entity in SgNB, it may be possible to recover the SgNB connection via the communication with SgNB directly.

Figure 4:
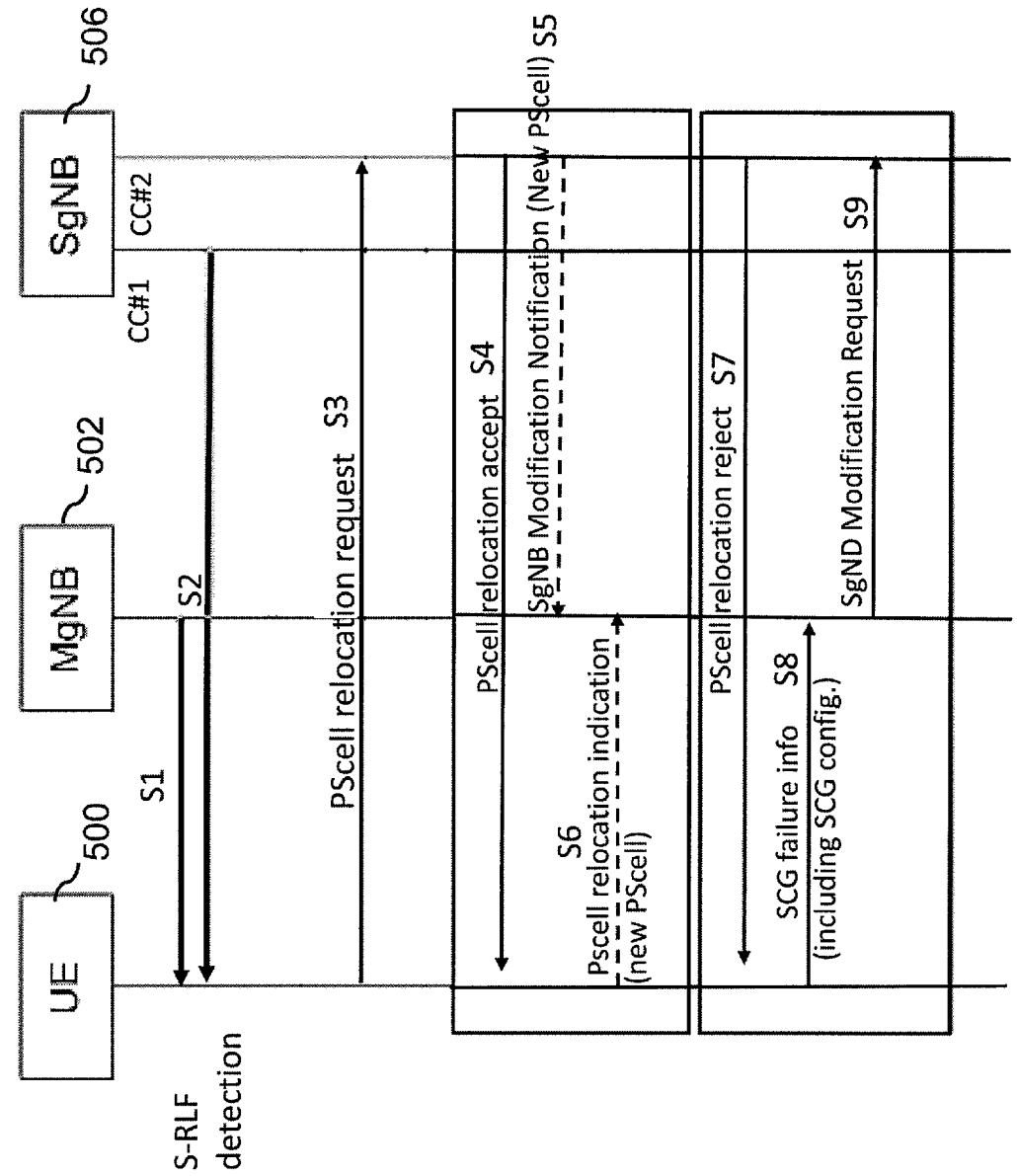
FIG. 4 shows an example signal flow.

One example of a method of an embodiment will now be described in relation to FIG. 4. The UE is referenced 500, the MgNB is referenced 502 and the SgNB is referenced 506. It should be appreciated that the UE, MgNB and the SgNB may be arranged as discussed in relation to the MeNB and SeNB of option 2, shown FIG. 3b.

In step S1 the UE receives communications from the MgNB and in step S2 receives communications from the SgNB. Of course these steps may be taking place in any order or at the same time. The UE may be monitoring the communications with the MgNB and SgNB to identify a potential RLF.

In some embodiments, the UE may initiate the PScell relocation procedure with the SgNB upon S-RLF. For example, a UE may monitor a PScell for radio link failure of the SgNB, and upon S-RLF detection, the UE may select the best/suitable cell of SCG as target PScell and initiate random access procedure to the target PScell. Optionally, a dedicated preamble can be preconfigured to facilitate the access.

In some embodiments, the UE may be determining or be responsive to a SCG (secondary cell group) RLF. This may comprises one or more of a PScell failure based on a L1 OOS indication, a RA (radio access) failure, and RLC failure. (RA and RLC failure detection can be done in other Scells within SCG as well).

By having UE first attempt PScell recovery in the SCG cells over air interface, recovery can be faster than by reporting SCG failure to MgNB and then relying on MgNB to change SeNB/PScell over X2/Xn interface. Fast recovery may have the benefit of less service interruption.

In step S3, the UE sends an RRC message to the SgNB over the selected target PScell to request relocation of PScell from the source PScell to the target PScell. In some embodiments an RRC reestablishment request message may be used. In other embodiments, any other suitable message may be used.

Optionally the message may comprise an indication that of a request that the SgNB link is to be recovered. This may be a RRC procedure, and to transmit the relocation request message, a random access procedure may have to be first triggered to acquire the uplink TA (timing advance) and uplink grant for transmitting the RRC message.

Steps S3, S4 and S5 are performed if the PScell relocation message is accepted. In step S3, the SgNB will acknowledge or otherwise acknowledge the relocation request. This may be over the SCG SRB (signalling radio bearer).

In step S4, the SgNB sends a message to the MgNB to inform the MgNB of the new PSCell. This message may be a SgNB modification notification. In this way, the DC operation is recovered by connecting to a new PScell in the same SCG.

In step S5, the UE sends a message to the MgNB to inform the MgNB of the new PSCell. This message may be PScell relocation indication. In this way, the DC operation is recovered by connecting to a new PScell in the same SCG.

In some embodiments, only one of steps S4 and S5 may be provided. In some embodiments, where both steps are provided, the steps may be provided in either order or at the same time.

Steps S6, S7 and S8 are performed if the PScell relocation message is rejected. Thus if the air interface PScell recovery fails, the UE may still rely on a MgNB-initiated scheme.

In step S6, the SgNB rejects the request by sending a PScell relocation rejection message to the UE. This may be over the SCG SRB. In some embodiments, this step may be omitted.

Alternatively or additionally, in step S7, if the UE fails to find the best or a suitable SCG cell for PScell relocation, the UE sends a message to the MgNB that a SgNB change is required. In this message transmitted to the MgNB, the UE may provide at least some of the current SCG configuration. Alternatively or additionally one or more of available measurement results and a RLF cause may be provided.

The message sent in step S7 may be a SCG failure information message.

In some embodiments, the SCG configuration may be configured by the SgNB over SCG SRB independently from MgNB. Therefore MgNB may not be aware of the SCG configuration. However, when the MgNB initiates a SCG Modification request procedure with a target SgNB, the whole SCG configuration is needed at the target SgNB side and is used by the target SgNB to apply a delta configuration when accepting the SeNB modification request. In this embodiment, there may be advantages if the UE provides the current SCG configuration to the MgNB.

In step S8, the MgNB will send a SgNB modification request to a target SgNB (which can be the same or different from the old SgNB).

The subsequent procedure may follow at least in part the proposal used for LTE DC. For example, this may be as defined in TS36.300. The target SgNB may reply to the MgNB with a SgNB modification request acknowledgement message. In this message the SgNB provides a new SCG configuration with delta signalling based on the received old SCG configuration. The MgNB may then initiate the RRC connection reconfiguration procedure. Upon successful completion of the reconfiguration, the success of the procedure is indicated in the SgNB reconfiguration complete message sent by the MgNB to the SgNB. If instructed, the UE may perform synchronisation towards the PSCell of the SgNB. Otherwise, the UE may perform UL (uplink) transmission after having applied the new configuration. If applicable, data forwarding between MgNB and the SgNB may take place. If applicable, a path update may be performed.

In other embodiments, a different procedure may be followed.

It should be appreciated that the above examples have been in the context of NR-NR-DC. However, it should be appreciated that other embodiments can be provided in any other suitable dual connectivity scenario. For example, some embodiments may be provided in a LTE-NR interworking scenario. In this case the MgNB of the above examples would be replaced by a MeNB or the SgNB is replaced by a SeNB. Other embodiments may be used with one or more other standards.

Embodiments have been described in the context of radio link failures. It should be appreciated that other embodiments may be used where any other radio link problem has been identified.

The described functions may be provided by separate processors or by an integrated processor. The at least one data processor and memory may provide means for implementing the herein described methods.

The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations, operation of the timers and communications of information. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to certain architectures, similar principles can be applied to other systems. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

What is claimed is:

1. A method comprising:
   in a user device in communication with a master base station and a secondary base station, responsive to a radio link problem associated with a primary secondary cell that is a first secondary cell of the secondary base station, selecting by the user device a second secondary cell of the secondary base station as a target secondary cell, wherein the first secondary cell and the second secondary cell of the secondary base station use different carriers;
   initiating by the user device a relocation procedure with said target secondary cell, wherein said initiating comprises transmitting a relocation request by the user device directly to said secondary base station, the relocation request requesting relocation of the primary secondary cell from the first secondary cell to the target secondary cell; and
   completing by the user device the relocation procedure to relocate the primary secondary cell from the first secondary cell to the target secondary cell, wherein the user device stays in a connected mode for at least the initiating the relocation procedure and the completing the relocation procedure.

2. A method as claimed in claim 1, comprising receiving a response to said relocation request and in response thereto causing information about said target secondary cell to be transmitted to a primary base station by said user device.

3. A method as claimed in claim 2, wherein said response comprises an acknowledgement of said relocation request.

4. A method as claimed in claim 1, comprising monitoring said primary secondary cell to determine said radio link problem.

5. A method as claimed in claim 1, wherein transmitting the relocation request by the user device directly to said secondary base station comprises transmitting the relocation request by the user device directly to said second secondary cell of the secondary base station.

6. A computer program product comprising a non-transitory computer readable medium having program code thereon, wherein the program code is adapted to cause a data processing apparatus to perform the steps of claim 1 when the program code is run on the data processing apparatus.

7. A method comprising:
responsive to a radio link problem associated with a primary secondary cell that is a first secondary cell of a secondary base station in communication with a user device that is also in communication with a master base station, receiving from a user device a relocation request at the secondary base station requesting relocation of said primary secondary cell from the first secondary cell of the secondary base station to a target secondary cell of the same secondary base station, wherein the first secondary cell and the second secondary cell of the secondary base station use different carriers;
accepting by the secondary base station the request; and
performing and completing, by the secondary base station and in conjunction with the user device, a relocation procedure to relocate the primary secondary cell from the first secondary cell to the target secondary cell, wherein the user device stays in a connected mode for at least the performing the relocation procedure and the completing the relocation procedure.

8. A method as claimed in claim 7, further comprising causing a response to said relocation request to be transmitted to said user device.

9. A method as claimed in claim 8, wherein said response comprises an acknowledgement of said relocation request.

10. The method of claim 7, further comprising sending, after receiving the relocation request, a message and accepting the relocation request, from the secondary base station to the master base station to inform the master base station that the second secondary cell is a new primary secondary cell for the user device.

11. An apparatus, comprising:
at least one processor; and
at least one memory including computer program code, the at least one memory and computer program code configured to, with the at least one processor, cause the apparatus at least to:
in a user device in communication with a master base station and a secondary base station, responsive to a radio link problem associated with a primary secondary cell that is a first secondary cell of a secondary base station, select by the user device a second secondary cell of the secondary base station as a target secondary cell, wherein the first secondary cell and the second secondary cell of the secondary base station use different carriers;
initiate by the user device a relocation procedure with said target secondary cell, wherein said initiating comprises transmitting a relocation request by the user device directly to said secondary base station, the relocation request requesting relocation of the primary secondary cell from the first secondary cell to the target secondary cell; and
complete by the user device the relocation procedure to relocate the primary secondary cell from the first secondary cell to the target secondary cell, wherein the user device stays in a connected mode for at least the initiating the relocation procedure and the completing the relocation procedure.

12. An apparatus as in claim 11, wherein the at least one memory and computer program code configured to, with the at least one processor, cause the apparatus at least to: receive a response to said relocation request and in response thereto cause information about said target secondary cell to be transmitted to the master base station by said user device.

13. An apparatus as in claim 12, wherein said response comprises an acknowledgement of said relocation request.

* * * * *

UNITED STATES PATENT AND TRADEMARK OFFICE
CERTIFICATE OF CORRECTION

PATENT NO. : 11,700,553 B2
APPLICATION NO. : 16/636725
DATED : July 11, 2023
INVENTOR(S) : Haitao Li and Lei Du It is certified that error appears in the above-identified patent and that said Letters Patent is hereby corrected as shown below:

On the Title Page

Item (54) and in the Specification, Column 1, Line 1, After "Method" delete "of" and replace with --and--

Signed and Sealed this
Fifth Day of September, 2023

Katherine Kelly Vidal
*Director of the United States Patent and Trademark Office*